United States Patent
Balachandran et al.

(10) Patent No.: US 12,276,852 B2
(45) Date of Patent: Apr. 15, 2025

(54) REWINDABLE OPTICAL FIBER CABLE

(71) Applicant: Sterlite Technologies Limited, Gurgaon (IN)

(72) Inventors: Binod Balachandran, Gurgaon (IN); Sudipta Bhaumik, Gurgaon (IN); Swapnil Sharma, Gurgaon (IN)

( * ) Notice: Subject to any disclaimer, the term of this patent is extended or adjusted under 35 U.S.C. 154(b) by 0 days.

(21) Appl. No.: 17/485,267

(22) Filed: Sep. 24, 2021

(65) Prior Publication Data

US 2022/0317401 A1 Oct. 6, 2022

(30) Foreign Application Priority Data

Mar. 30, 2021 (IN) .............................. 202111014504

(51) Int. Cl.
G02B 6/44 (2006.01)
(52) U.S. Cl.
CPC .................................. G02B 6/4432 (2013.01)
(58) Field of Classification Search
CPC ....................................................... G02B 6/4432
See application file for complete search history.

(56) References Cited

U.S. PATENT DOCUMENTS

| | | | | |
|---|---|---|---|---|
| 4,696,542 A | * | 9/1987 | Thompson | G02B 6/4427 385/108 |
| 4,743,085 A | * | 5/1988 | Jenkins | G02B 6/443 385/113 |
| 5,109,457 A | * | 4/1992 | Panuska | G02B 6/4433 174/23 R |
| 5,212,755 A | * | 5/1993 | Holmberg | G02B 6/4429 385/104 |
| 10,107,980 B1 | * | 10/2018 | Debban | G02B 6/4404 |
| 2011/0081122 A1 | * | 4/2011 | Kim | G02B 6/4494 385/103 |
| 2011/0293228 A1 | * | 12/2011 | Keller | G02B 6/4486 385/103 |
| 2015/0268433 A1 | * | 9/2015 | Stratton | G02B 6/4416 385/101 |
| 2019/0049681 A1 | * | 2/2019 | Bookbinder | G02B 6/4429 |
| 2021/0223491 A1 | * | 7/2021 | Shimizu | G02B 6/4403 |

FOREIGN PATENT DOCUMENTS

| | | | | | |
|---|---|---|---|---|---|
| CN | 106842465 A | * | 6/2017 | | G02B 6/4432 |
| CN | 108957658 A | * | 12/2018 | | G02B 6/443 |
| EP | 0175419 A1 | * | 3/1986 | | |
| KR | 20150140512 A | * | 12/2015 | | G02B 6/4401 |
| WO | WO-2008132637 A1 | * | 11/2008 | | G02B 6/4492 |

OTHER PUBLICATIONS

English translation of KR-20150140512-A (Year: 2015).*
English translation of CN-106842465-A (Year: 2017).*

* cited by examiner

*Primary Examiner* — Charlie Y Peng
(74) *Attorney, Agent, or Firm* — Steven R. Fairchild; Arun Narasani

(57) ABSTRACT

A low fatigue rewindable optical fiber cable comprises a core having at least one optical transmission element, a dielectric armouring surrounding the core and a sheath surrounding the dielectric armouring. Particularly, the low fatigue rewindable optical fiber cable is characterized by a fatigue performance ratio (FPR) which is a ratio of a cross sectional area of the sheath and a cross sectional area of the dielectric armouring and is between 3 to 4.5 that enables at least 10 cyclic winds and unwinds carried out on a drum with a diameter of 40 times an outer diameter of the low fatigue rewindable optical fiber cable.

17 Claims, 3 Drawing Sheets

REWINDABLE OPTICAL FIBER CABLE

CROSS-REFERENCE TO RELATED APPLICATIONS

This application claims the benefit of Indian Application No. 202111014504 titled "Rewindable Optical Fiber Cable" filed by the applicant on 30 Mar. 2021, which is incorporated herein by reference in its entirety.

FIELD OF THE INVENTION

Embodiments of the present invention relate to the field optical fiber cables, and more particularly, relates to a rewindable optical fiber cable.

DESCRIPTION OF THE RELATED ART

Optical fiber cables have secured an important position in building the optical network of modern communication systems across the globe. The optical fiber cables are part of millions of miles of the optical network. From mountain regions to shore lines, from remotest villages to urban environments, engineers have installed the optical fiber cables almost in every region for better internet connectivity and high bandwidth.

Oftentimes, due to natural disaster, human activities or undesired incidents, the optical fiber cables get damaged leading to disruption of the optical network. Repairing a damaged site to resume functioning of the optical network is a time taking process that increases network downtime. Measures can be taken to tackle the disruptions like a temporary replacement optical fiber cable can be installed to reduce the network downtime. However, the replacement optical fiber cable needs to have the ability to be used multiple times. Once the damage is repaired, the replacement optical fiber cable can be removed and wound back on a drum for future use. Every time the replacement optical fiber cable is used and removed, it undergoes unwinding and winding operations over the drum. A conventional unitube optical fiber cable with dielectric armouring has low fatigue resistance for repeated winding/unwinding operations, therefore, it has limited rewinding capability and starts experiencing mechanical degradation in a sheath and other cable elements after a few rewinds on the drum e.g., after 3 to 4 times wind and unwind operations. The multiple wind/unwind operations of the optical fiber cable generate internal stresses that degrades cable material e.g., sheath material and leads to fatigue failure of the optical fiber cable. The optical fiber cable comprises of layers of different materials such as sheath material, strength member's material, core material etc. During winding/unwinding, the generated internal stresses experienced by one layer (for example, sheath) are transferred to another layer (dielectric armouring) through shear stresses via bonding between them. If the sheath is not able to withstand stresses, it starts to transfer more load to the armouring layer via the bonding, which leads to deterioration of bonding material and eventually to deformations in the optical fiber cable. Thus, it is not feasible to use the same optical fiber cable multiple times for restoring optical connectivity. The optical fiber cable experiences significant fatigue after a few winds/unwinds and deterioration may start in the sheath and other cable elements due to mechanical weakening of the cable material. If we continue to use the same cable for further connectivity recoveries, the sheath may get ripped and the core of the cable may be exposed to environmental conditions or hazards, which may damage optical fibers present in the optical fiber cable.

Prior art reference of Indian patent application "IN201711023026A" discloses an optical fiber cable comprising a gel filled unitube structure, surrounded by a plurality of Kevlar rods and then a sheath. Similarly, another prior art reference of Chinese patent "CN206892411U" discloses an optical fiber cable comprising a unitube structure filled with water-blocking element and surrounded by FRP armouring.

However, the above mentioned conventional optical fiber cables do not provide a rewindable or reusable optical fiber cable. Therefore, there is an urgent need to provide an optical fiber cable that has high fatigue resistance to winding/rewinding operations. Hence, the present invention focuses on rewindable optical cable which is also and reusable multiple times when needed.

Any references to methods, apparatus or documents of the prior art are not to be taken as constituting any evidence or admission that they formed, or form part of the common general knowledge.

SUMMARY OF THE INVENTION

Embodiments of the present invention provide a low fatigue rewindable optical fiber cable. The low fatigue rewindable optical fiber cable includes a core having at least one optical transmission element, a dielectric armouring surrounding the core and a sheath surrounding the dielectric armouring.

In accordance with an embodiment of the present invention, the optical transmission element includes anyone of a plurality of optical fibers, a group of loose optical fibers, a group of optical fiber ribbons or a stack of optical fiber ribbons, a group of bendable ribbons, a group of corrugated ribbons, a group of partially bonded optical fiber ribbons.

In accordance with an embodiment of the present invention, the fatigue performance ratio (FPR) ratio is a ratio of a cross sectional area of the sheath and a cross sectional area of the dielectric armouring.

In accordance with an embodiment of the present invention, the fatigue performance ratio (FPR) ratio enables at least 10 cyclic winds and unwinds carried out on a drum with a diameter of 40 times an outer diameter of the low fatigue rewindable optical fiber cable.

In accordance with an embodiment of the present invention, a fatigue performance ratio (FPR) is in a range between 3 to 4.5.

In accordance with an embodiment of the present invention, the core comprises a tube such as a loose tube or a unitube or a monotube.

In accordance with an embodiment of the present invention, the tube is made of polybutylene terephthalate, polypropylene, polyamide or thermoplastic material or a combination thereof.

In accordance with an embodiment of the present invention, the dielectric armouring includes a plurality of strength members made from fiber reinforced plastic (FRP) or aramid reinforced plastic (ARP) or any other suitable dielectric strength members arranged around the tube, In accordance with an embodiment of the present invention, each strength member is in contact with the tube and an adjacent strength member.

In accordance with an embodiment of the present invention, the range of the fatigue performance ratio is defined for a number of strength members calculated for at least 90% space occupancy around the tube.

In accordance with an embodiment of the present invention, the range of the fatigue performance ratio is defined for the tube with an outer diameter between 3.5 mm to 7.5 mm In accordance with an embodiment of the present invention, the range of the fatigue performance ratio is defined for the tube with an inner diameter between 2.8 mm to 6.5 mm.

In accordance with an embodiment of the present invention the dielectric armouring having the plurality of strength members is arranged in helical fashion over the core.

In accordance with an embodiment of the present invention the plurality of strength members is coated with Ethylene Acrylic Acid (EAA) layer, Ethylene-Vinyl Acetate (EVA) or any other adhesion enhancing material.

In accordance with an embodiment of the present invention, the core contains one of a water blocking gel, a water swellable yarns or a water ingression prevention material.

In accordance with an embodiment of the present invention, the fatigue performance ratio is defined for the sheath having the thickness in between 1.3 mm to 2 mm.

In accordance with an embodiment of the present invention, the fatigue performance ratio is defined and optimized for the optical fiber cable having the outer diameter between 8.9 mm to 13.6 mm.

In accordance with an embodiment of the present invention, the plurality of strength members in dielectric armouring has a diameter in a range of 1 mm (millimetre) to 1.2 mm.

In accordance with an embodiment of the present invention, the plurality of strength members may be coated with EAA (Ethylene Acrylic Acid) or EVA (Ethylene-Vinyl Acetate).

In accordance with an embodiment of the present invention, the sheath is made of polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene or combination thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The invention herein will be better understood from the following description with reference to the drawings, in which.

ELEMENT LIST

Optical Fiber Cable 100
Sheath 102
Dielectric Armouring 104
Tube 106
Optical Fiber Ribbons 108
Optical Fiber 110
Water Blocking Gel 112
Rip cords 114

The method and system are illustrated in the accompanying drawings, throughout which like reference letters indicate corresponding parts in the various figures.

It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

Figure 1:
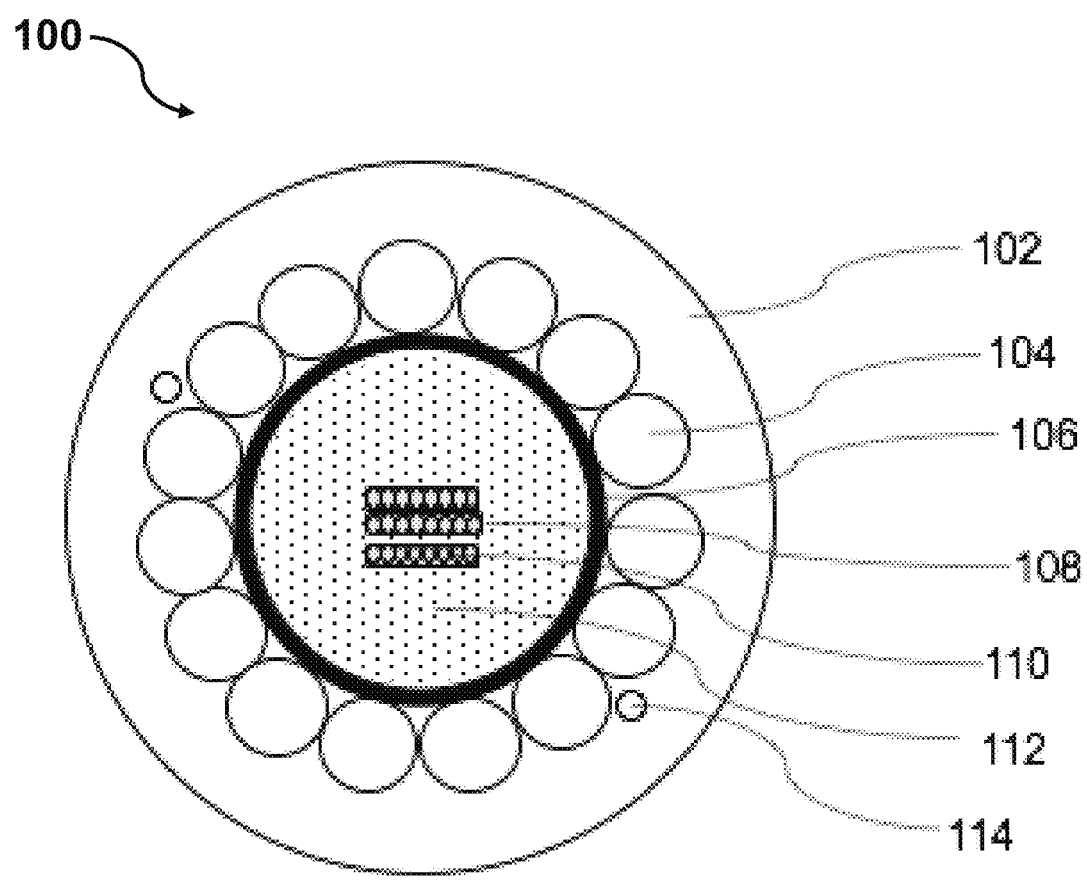
FIG. 1 is a pictorial representation of a rewindable optical fiber cable in accordance with one embodiment of the present invention.
Figure 2:
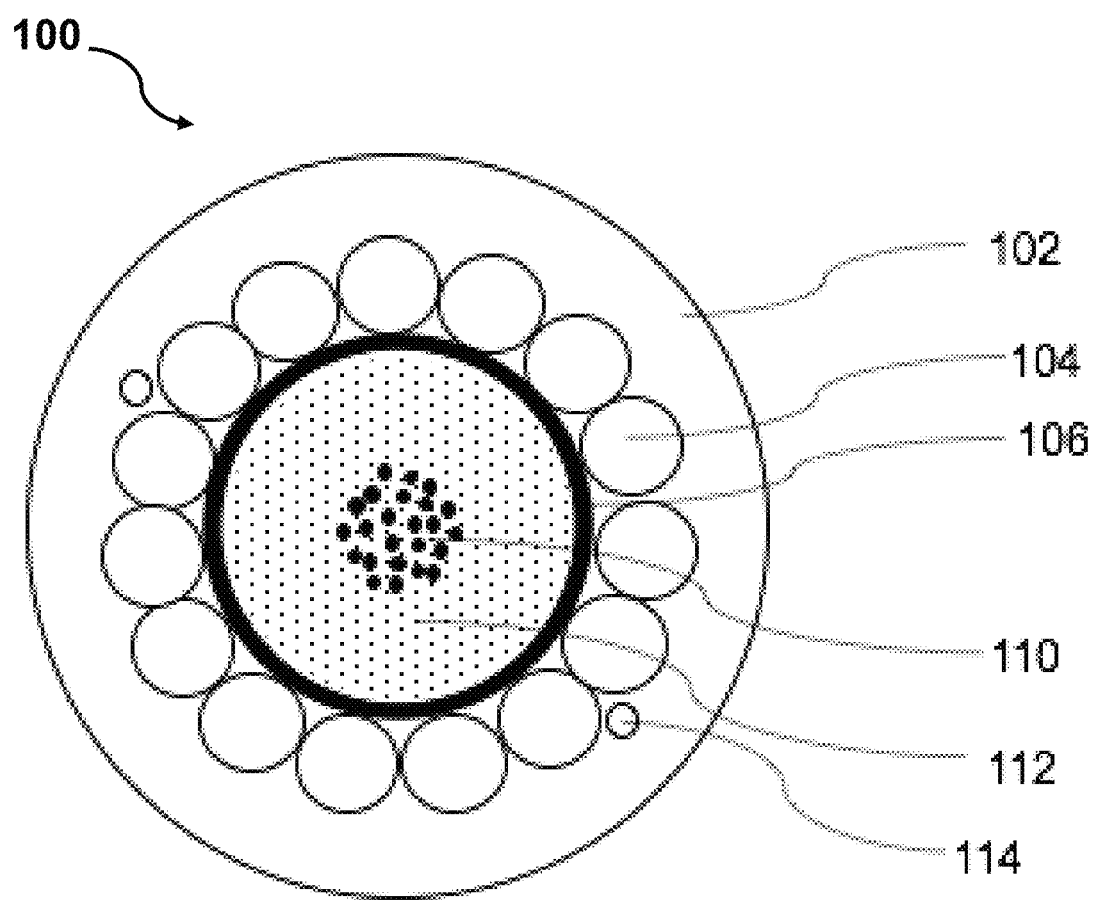
FIG. 2 is a pictorial representation of the rewindable optical fiber cable in accordance with another embodiment of the present invention.
Figure 3:
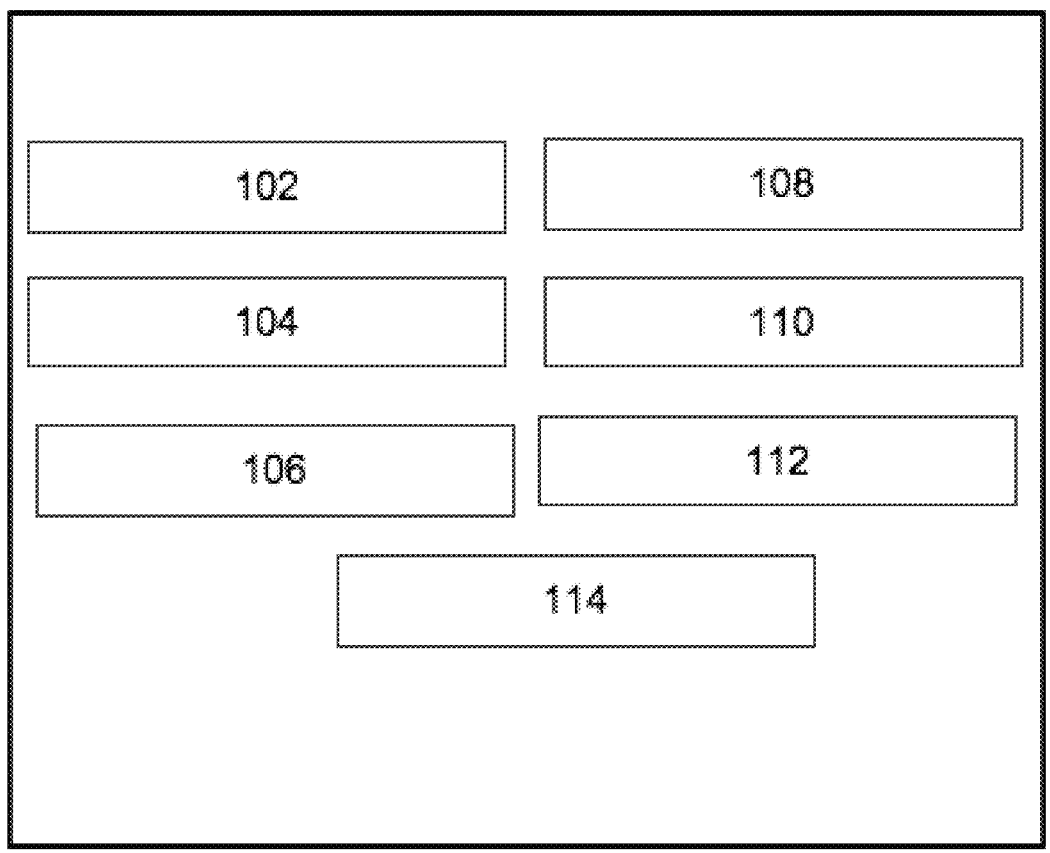
FIG. 3 is a block diagram illustrating components of the rewindable optical fiber cable in accordance with another embodiment of the present invention.

The principles of the present invention and their advantages are best understood by referring to FIG. 1 to FIG. 3. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Following terms shall apply throughout the present invention:

An optical fiber refers to a medium associated with transmission of information over long distances in the form of light pulses.

The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

Referring to FIG. 1 to FIG. 3 illustrating the rewindable optical fiber cable in accordance with one or more embodiments of the present invention. The optical fiber cable 100 has rewindable characteristics. In particular, rewindable characteristics imply capability of the optical fiber cable to wind and unwind multiple times. The optical fiber cable 100 may be rewindable and reusable for different optical connectivity damage or disaster affected optical networks. The optical fiber cable 100 is meant to be used as a replacement optical fiber cable for a damaged optical connectivity recovery, where loss of optical connectivity arises due to an undesired natural or human induced circumstances such as earthquake, flood, excavation activities etc.

In particular, the optical fiber cable 100 comprises a core having at least one optical transmission element 110. And, the optical transmission element may be present in form of, but not limited to, a plurality of optical fibers, a group of loose optical fibers, a group of optical fiber ribbons or a stack of optical fiber ribbons, a group of bendable ribbons, a group of corrugated ribbons, a group of partially bonded optical fiber ribbons.

The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.63 or G.652.D or other suitable category.

Moreover, the optical fiber may be a bend insensitive fiber that has less degradation in optical properties or less increment in optical attenuation during bending of the optical fiber cable. Thus, the bend insensitive fiber further helps to maintain the optical properties during multiple winding/unwinding operations of the optical fiber cable.

In one aspect of the invention, the optical fibers may be coloured fiber.

In another aspect of the invention, the optical fiber may be a single-core optical fiber, a multi-core optical fiber, a single-mode optical fiber, a multimode optical fiber or the like. Particularly, the single mode optical fiber carries only a single mode of light and the multimode optical fiber carries multiple modes of light to propagate. Moreover, the multi-core optical fibers include multiple cores as opposed to the single-core optical fiber that includes only a single core.

A core of the optical fiber cable is a unitube/monotube design consisting of a single buffer tube or loose tube carrying optical transmission elements. A multitube cable design will increase the optical fiber cable size and incur complexities of handling and manufacturing of the optical fiber cable. A buffer tube is used in an optical fiber cable to provide mechanical isolation and protection to the optical fibers from physical damages.

Further, an optical fiber ribbon bundle is a group of a plurality of optical fiber ribbons arranged together. Moreover, the optical fiber ribbon includes a number of optical fibers arranged together using a matrix material. Further, multiple individual optical fiber ribbons are stacked or grouped into a bundle to form the optical fiber ribbon bundle. Furthermore, a partially bonded optical fiber ribbon from the group of intermittently bonded optical fiber ribbons is formed by intermittently bonding the plurality of optical fibers with the matrix material that imparts a bending and rolling capability along a width of the partially bonded optical fiber ribbon.

Referring to FIG. 1, the optical fiber cable has the core formed by a tube 106 encapsulating the group of optical fiber ribbons 108 having at least one optical fiber 110 surrounded by a water blocking gel 112.

Alternatively, the core may contain water swellable yarns or any other water ingression prevention material such as tape or the like.

And, referring to FIG. 2, the optical fiber cable has the core formed by the tube 106 having at least one loose optical fiber 110 surrounded by the water blocking gel 112.

Alternatively, the core may include water swellable yarns or a water ingression prevention material such as tape or the like.

Particularly, the tube 106 may be a loose tube, a unitube, a monotube or the like. Moreover, the tube 106 is made up of, but not limited to, PBT (polybutylene terephthalate), polypropylene (PP), polyamide, thermoplastic material or a combination of any suitable material.

In an example, the tube 106 may comprise up to 144 optical fibers as outdoor optical fiber cables normally contain optical fibers up to 144.

Further, the core is surrounded by a dielectric armouring (or a dielectric armouring layer) 104 to provide mechanical strength and stiffness to the optical fiber cable. And, the dielectric armouring layer may be made from a plurality of strength members. The plurality of strength members may be made of, but not limited to, FRP (Fiber Reinforced Plastic), ARP (Aramid Reinforced Plastic) or any other suitable dielectric/strength material. The plurality of strength members is arranged around the core, wherein each strength member is in contact with the tube (preferably unitube) and the adjacent strength member(s).

The dielectric armouring 104, i.e., the plurality of strength members, is arranged helically around the tube 106 (i.e., around the core). The helical arrangement of the plurality of strength members provides a little extra length to the strength layer i.e., the dielectric armouring as compared to if it was placed longitudinally. And, the extra length helps to reduce the stress on the strength layer during a bending operation of the optical fiber cable. The dielectric armouring enables the optical fiber cable 100 to be used nearby a high voltage cable as armouring of metal wires are prone to lightning strikes and electromagnetic effects from a nearby high voltage line. The dielectric armouring 104 formed by the plurality of strength members may have a round shape, a flat shape or any other suitable shape.

Number of strength members to be arranged around the tube 106 is calculated for a round figure of strength members that will occupy at least 90% space when kept in a circumscribing fashion around the tube as below 90% occupancy of the plurality of strength members, there may be a large gap in between the strength members and thus, uniformity of the dielectric armouring may not be achieved and there may also be a risk of movement of the plurality of strength members in the gap which may damage the optical fiber cable.

The plurality of strength members in dielectric armouring 104 has a diameter in a range of 1 mm (millimetre) to 1.2 mm. The plurality of strength members has optimized dimensions to meet criteria for the unitube optical fiber cable designed for fiber count up to 144. In particular, the plurality of strength members may be coated with EAA (Ethylene Acrylic Acid) or EVA (Ethylene-Vinyl Acetate) coating for better adhesion with a sheath (or jacket) 102 to enhance the adhesion of the plurality of strength members with the sheath 102. Moreover, the plurality of strength members is surrounded by the sheath 102. Furthermore, the plurality of strength members 104 may be partially or completely embedded in the sheath 102.

The sheath 102 is extruded over the plurality of strength members i.e., the dielectric armouring 104. Usually, sheathing (extrusion) is done at a high temperature (preferably more than 100° C.). The sheathing is a process of squeezing a molten sheathing material through a funnel of a die as the core runs through the center. In particular, the sheathing material for the sheath may include, but not limited to, polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene or combination thereof. Moreover, the sheath 102 may have a thickness in a range of 1.3 mm to 2 mm as below the thickness of 1.3 mm, the sheath 102 may become mechanically weak and during multiple windings, the sheath may get ripped. Further, the thickness of the sheath 102 beyond 2 mm results in a bulky optical fiber cable with very high stiffness and with degraded temperature cycling performance.

The optical fiber cable 100 may have one or more rip cords 114 for easy stripping of the sheath 102 to easily access at least one optical transmission element 110.

In particular, the optical fiber cable 100 is a low fatigue rewindable optical fiber cable and characterized by a fatigue performance ratio (FPR). The fatigue performance ratio is defined as a ratio of a cross sectional area of the sheath 102 to a cross sectional area of the plurality of strength members i.e., the dielectric armouring 104. And, the cross sectional area of the sheath 102 is related to the thickness of the sheath 102. The cross-sectional area of the sheath 102 increases when the thickness of the sheath 102 increases and decreases as the thickness of the sheath decreases. The cross-sectional area of dielectric armouring 104 is related to the number of the plurality of strength members and the diameter of each of the plurality of strength members.

In an aspect of the present invention, the fatigue performance ratio for the optical fiber cable is optimized and is in a range of 3 to 4.5 imparting a low fatigue rewinding characteristics that makes the optical fiber cable rewindable and reusable and further enables the optical fiber cable 100 to withstand at least 10 cyclic winds and unwinds operations carried out on a drum (or drum barrel) with a diameter of 40 times of an outer diameter of the optical fiber cable. The minimum bend diameter of the optical fiber cable is 40 times the outer diameter of the optical fiber cable, thereby, the diameter of the drum is kept as 40 times the outer diameter of the optical fiber cable. The diameter of the drum of more than 40 times the outer diameter of the optical fiber cable will increase the size of the drum. The low fatigue rewinding is defined as cyclic winding and unwinding of the optical fiber cable with reduced physical weakening of the optical fiber cable components. During the repeated winding/unwinding operations, the optical fiber cable faces internal stresses, due to which fatigue starts to develop in the optical fiber cable that deteriorates the optical fiber cable materials over the time e.g., the sheath 102 of the optical fiber cable 100. Thus, it is necessary to identify stresses experienced by the optical fiber cable 100.

The fatigue or stress ($Stress_{max}$) experienced by the optical fiber cable during bending is calculated by equation 1:

$$Stress_{max} = (YM_c * R_c)/(BR_c) \quad (1)$$

where
$YM_c$ is Young's Modulus of the optical fiber cable,
$R_c$ is radius of the optical fiber cable,
$BR_c$ is bending radius of the optical fiber cable,
The $YM_c$ i.e., Young's modulus of the optical fiber cable is calculated by equation 2:

$$YM_C = \frac{YM_{SM} + YM_S * \left(\frac{Area\ S}{Area\ SM}\right) + YM_T * \left(\frac{Area\ T}{Area\ SM}\right) + \ldots}{1 + \left(\frac{Area\ S}{Area\ SM}\right) + \left(\frac{Area\ T}{Area\ SM}\right) + \ldots} \quad (2)$$

Where
$YM_{SM}$ is Young's modulus of the plurality of strength members,
$YM_S$ is Young's modulus of the sheath,
Area S is a cross sectional area of the sheath proportional to the sheath thickness,
Area SM is a cross sectional area of the plurality of strength members,
$YM_T$ is Young's modulus of the tube,
Area T is a cross sectional area of the tube.

In particular, the Young's Modulus relates to stiffness of a material. In the optical fiber cable, the materials may be the materials used in forming the sheath and the strength members. By keeping the Young's Modulus values of right hand side (RHS) of the equation 2 constant and by increasing the cross-sectional area of the sheath (Area S), the Young's modulus of the optical fiber cable ($YM_c$) will decrease. The $YM_{SM}$ value in equation 2 numerator is significantly larger than the $YS_S$ and $YM_T$. Hence, these values can be neglected for calculating the $YM_{SM}$. Similarly, in the equation 2 denominator, the ratio of Area S and Area SM is much larger than the ratio of Area T and Area SM. Hence, the ratio of Area T and Area SM may be neglected for the calculations. If, the cross-sectional area of the sheath (Area S) is increased by means of increasing the thickness of the sheath, the Young's modulus of the optical fiber cable ($YM_c$) will fall a little lower than $I/OD^2$, where OD is the outer diameter of the optical fiber cable as the outer diameter of the sheath is equal to the outer diameter of the optical fiber cable.

In equation 1, by increasing the OD (outer diameter of the optical fiber cable) and by keeping the bending radius of the optical fiber cable constant, the radius of optical fiber cable will scale by the outer diameter (OD) of the optical fiber cable and the Young's modulus will scale by a little less than ($1/OD^2$). Thus, the optical fiber cable's $Stress_{max}$ will fall as the OD increases. Thus, it is established that an increase in the OD reduces the chances of fatigue to the optical fiber cable. Therefore, the thickness of the sheath is kept in the range of 1.3 mm to 2 mm, depending upon optical fiber count in the optical fiber cable which is slightly larger than a conventional optical fiber cable (cable with high fatigue rewinding). The optical fiber cable achieves the low fatigue performance by having a fatigue performance ratio between 3 to 4.5 for the thickness of the sheath in the range of 1.3 mm to 2 mm as mentioned above. The increase in thickness of the sheath enables the sheath 102 to withstand more stresses and therefore, less load transfers to the armouring layer via the bonding between them and stress are distributed more uniformly within the optical fiber cable. The shear stresses in the bonding material are reduced which further reduces the deteriorations and/or deformations in the optical fiber cable, thus, enabling the optical fiber cable to withstand fatigue failure for multiple wind/unwind operations.

Moreover, by increasing the thickness of the sheath of the optical fiber cable, kinking behaviour of the optical fiber cable improves as tensile elements of the optical fiber cable have poor compressive strength. Thus, more thermoplastic material ensures that compressive forces are bearable by the optical fiber cable structure to prevent buckling of the optical fiber cable.

As from the equation (2), it can be seen that the stress, thus the fatigue, in the optical fiber cable is dependent upon the ratio (i.e., the fatigue performance ratio) of the cross sectional area of the sheath 102 and the cross sectional area of the dielectric armouring 104, an improved low-fatigue structure can be obtained by optimizing the ratio. Hence, the fatigue performance ratio is optimized and is in the range of 3 to 4.5 to obtain the optical fiber cable having low fatigue and thereby enabling multiple winding/rewinding capability for using as a replacement cable. The optical fiber cable exhibits high fatigue resistance during winding/unwinding operations and experiences less mechanical degradation in the sheath, therefore, the cable lasts longer for multiple use for such operations e.g. at least 10 cyclic winds and unwinds carried out on a drum with a diameter of 40 times the outer diameter of the optical fiber cable. Below the fatigue performance ratio 3, the optical fiber cable may experience significant fatigue which may lead to damage/failure during multiple winding and unwinding. Moreover, if the fatigue performance ratio is beyond 4.5, the thickness of the sheath will become large that leads to the bulky optical fiber cable with very high stiffness.

For example, the optical fiber cable 100 with the outer diameter (OD) of 9 mm, having 24 optical fibers inside the unitube having an internal diameter (ID) of 3.2 mm and the outer diameter of 4 mm with the plurality of strength members made of FRP having diameter of 1 mm each and number of strength members as 15 with at least 90% space occupancy, the fatigue performance ratio for the thickness of the sheath as 1.3 mm is calculated as 3.04. Further, the fatigue performance ratio of the thickness of the sheath as 2 mm is calculated as 4.

The decrease in $Stress_{max}$ of the optical fiber cable indicates that when load sharing of multiple components in the optical fiber cable becomes more equitable, the shear stress on a bonding between different material layers reduces. If the bonding breaks, then behaviour of the optical fiber cable deviates significantly from the designed/defined values, hence it is important to decrease the stress on the bonding. Thus, coating of the plurality of strength members with EAA, EVA or any other adhesion enhancing material helps in reducing the stress in the optical fiber cable during winding/unwinding operations.

Herein, the range of the fatigue performance ratio is defined and optimized for the optical fiber cable 100 having the outer diameter between 8.9 mm to 13.6 mm. Further, the fatigue performance ratio is defined for the sheath having the thickness in between 1.3 mm to 2 mm and for the unitube with an outer diameter between 3.5 mm to 7.5 mm and the inner diameter between 2.8 mm to 6.5 mm. Dimension ranges of the unitube are defined based on optimized design to in-house the optical fiber count up to 144 required for the unitube optical fiber cable. Alternatively, the outer diameter and inner diameter of the unitube may vary. Furthermore, the fatigue performance ratio is defined for the number of strength members calculated for at least 90% space occupancy around the unitube.

Advantageously, the optical fiber cable 100 may be placed near high voltage lines due to the dielectric armouring (the plurality of strength members). Further, the dielectric armouring imparts tensile strength to the optical fiber cable. Uniform arrangement of the plurality of strength members enables uniform stiffness that assists the optical fiber cable 100 in achieving better blowing performance.

Unlike conventional optical fiber cables, the present disclosure proposes an optical fiber cable that has a high resistance to fatigue failure for winding/unwinding operations and therefore, is rewindable and reusable. The optical fiber cable may be used as a temporary cable that can be installed at a damaged site to reduce maintenance downtime of an optical network, where damage may happen due to natural disaster, human activity or any undesired incident. Upon completion of repair tasks at the damaged site, the optical fiber cable can be removed and wound back on a drum for future use.

Moreover, the optical fiber cable is a temporary replacement cable which may be used multiple times (i.e., reusable) for different optical connectivity damage or disaster recoveries, thereby designed and manufactured in such a way that possesses characteristics to withstand fatigue failure by resisting mechanical degradation in sheath of the optical fiber cable that occurs due to multiple winding and/or unwinding of the optical fiber cable on the drum. The optical fiber cable of the present disclosure has a low fatigue rewindable design with optimized choice of sheath thickness and strength member size, where cross-sectional area of the sheath/cross-sectional area of strength members is in a range of 3 to 4.5.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

It is to be understood that the terms so used are interchangeable under appropriate circumstances and embodiments of the invention are capable of operating according to the present invention in other sequences, or in orientations different from the one(s) described or illustrated above.

What is claimed is:

1. A low fatigue rewindable optical fiber cable, comprising:
   a core formed by a tube having at least one optical transmission element, the at least one optical transmission element having a group of optical fiber ribbons that includes a number of optical fibers arranged together using a matrix material,
   a partially bonded optical fiber ribbon from the group of intermittently bonded optical fiber ribbons is formed, by intermittently bonding the plurality of optical fibers with the matrix material for imparting a bending and rolling capability along a width of the partially bonded optical fiber ribbon;
   a dielectric armouring surrounding the core, wherein the dielectric armouring having a plurality of strength members is arranged in helical fashion over the core wherein one or more strength members are in contact with each and each of the strength member has a diameter in a range of 1 mm (millimetre) to 1.2 mm; and
   a sheath surrounding the dielectric armouring.

2. The low fatigue rewindable optical fiber cable as claimed in claim 1, wherein a fatigue performance ratio (FPR) ratio is a ratio of a cross sectional area of the sheath and a cross sectional area of the dielectric armouring.

3. The low fatigue rewindable optical fiber cable as claimed in claim 2, wherein the fatigue performance ratio (FPR) ratio enables at least 10 cyclic winds and unwinds carried out on a drum with a diameter of 40 times an outer diameter of the low fatigue rewindable optical fiber cable.

4. The low fatigue rewindable optical fiber cable as claimed in claim 2, wherein the fatigue performance ratio (FPR) is in a range between 3 to 4.5.

5. The low fatigue rewindable optical fiber cable as claimed in claim 1, wherein the tube is one of a loose tube or a unitube or a monotube.

6. The low fatigue rewindable optical fiber cable as claimed in claim 5, wherein the tube is made of polybutylene terephthalate, polypropylene, polyamide or thermoplastic material or a combination thereof.

7. The low fatigue rewindable optical fiber cable as claimed in claim 1, wherein the dielectric armouring includes the plurality of strength members made from fiber reinforced plastic (FRP) or aramid reinforced plastic (ARP) or any other suitable dielectric strength members arranged around the tube.

8. The low fatigue rewindable optical fiber cable as claimed in claim 1, wherein each strength member of the plurality of strength members is in contact with the tube and an adjacent strength member.

9. The low fatigue rewindable optical fiber cable as claimed in claim 2, wherein a range of the fatigue performance ratio is defined for a number of strength members calculated for at least 90% space occupancy of the strength members around the tube.

10. The low fatigue rewindable optical fiber cable as claimed in claim 9, wherein the range of the fatigue performance ratio is defined for the tube with an outer diameter between 3.5 mm to 7.5 mm.

11. The low fatigue rewindable optical fiber cable as claimed in claim 9, wherein the range of the fatigue performance ratio is defined for the tube with an inner diameter between 2.8 mm to 6.5 mm.

12. The low fatigue rewindable optical fiber cable as claimed in claim 1, wherein the plurality of strength members is coated with Ethylene Acrylic Acid (EAA) layer, Ethylene-Vinyl Acetate (EVA) or any other adhesion enhancing material.

13. The low fatigue rewindable optical fiber cable as claimed in claim 1, wherein the core contains one of a water blocking gel, a water swellable yarns or a water ingression prevention material.

14. The low fatigue rewindable optical fiber cable as claimed in claim 1, wherein a fatigue performance ratio is defined for the sheath having a thickness in between 1.3 mm to 2 mm.

15. The low fatigue rewindable optical fiber cable as claimed in claim 1, wherein a fatigue performance ratio is defined and optimized for the low fatigue rewindable optical fiber cable having the outer diameter between 8.9 mm to 13.6 mm.

16. The low fatigue rewindable optical fiber cable as claimed in claim 1, wherein the optical transmission element includes anyone of a plurality of optical fibers, a group of loose optical fibers, a group of optical fiber ribbons or a stack of optical fiber ribbons, a group of bendable ribbons, a group of corrugated ribbons, a group of partially bonded optical fiber ribbons.

17. The low fatigue rewindable optical fiber cable as claimed in claim 1, wherein the sheath is made of polyvinyl chloride, polyethylene, polyurethane, thermoplastic rubber/elastomer, thermoplastic chlorinated polyethylene or combination thereof.

* * * * *